United States Patent [19]
Seki et al.

[11] Patent Number: 4,870,597
[45] Date of Patent: Sep. 26, 1989

[54] COMPLEX CURVED SURFACE CREATION METHOD

[75] Inventors: Masaki Seki; Norihisa Amano, both of Tokyo, Japan

[73] Assignee: Fanuc Ltd., Minamitsuru, Japan

[21] Appl. No.: 57,932

[22] PCT Filed: Sep. 11, 1986

[86] PCT No.: PCT/JP86/00464

§ 371 Date: May 13, 1987

§ 102(e) Date: May 13, 1987

[87] PCT Pub. No.: WO87/01830

PCT Pub. Date: Mar. 26, 1987

[30] Foreign Application Priority Data

Sep. 13, 1985 [JP] Japan .................. 60-202809

[51] Int. Cl.$^4$ ............................................. G06F 15/46
[52] U.S. Cl. ................................ 364/474.29; 364/191
[58] Field of Search .......................... 364/167–171, 364/191–193, 474, 475, 474.29; 318/568

[56] References Cited

U.S. PATENT DOCUMENTS

| | | | |
|---|---|---|---|
| 4,491,906 | 1/1985 | Kishi et al. | 364/191 |
| 4,523,270 | 6/1985 | Kishi et al. | 364/191 |
| 4,546,427 | 10/1985 | Kishi et al. | 364/168 |
| 4,569,014 | 2/1986 | Kishi et al. | 364/191 |
| 4,589,062 | 5/1986 | Kishi et al. | 364/168 |

Primary Examiner—John R. Lastova
Attorney, Agent, or Firm—Staas & Halsey

[57] ABSTRACT

This invention relates to a method of creating a complex curved surface, which includes a step of from data specifying three-dimensional curved surfaces (12a, 12b). Data is input specifying a reference line of intersection (CL$_i$) on the XY plane (10) and a rule for generating lines of intersection on the XY plane on the basis of the above-mentioned reference line of intersection. Also a range (SCR1, SCR2) is specified for each of the three-dimensional curved surfaces (12a, 12b) to obtain a section curve on the three-dimensional curved surface, for a section corresponding to one of the lines of intersection. The method includes obtaining first and second section curves (13a', 13b') in the range (SCR 1, SCR2) when first and second three-dimensional curved surfaces (12a, 12b) are cut by a section whose line of intersection with the XY plane is an i-th line of intersection (CL$_i$). Then, a point of intersection (CR$_i$) between the two section curves (13a', 13b') is obtained. Thereby, a set of first and second section curve segments A1 - CR$_i$, CR$_i$ - B2), having the point of intersection (CR$_i$) as a boundary, are used to define a section curve of the complex curved surface (11). The complex curved surface (11) is generated from sets of these section curves.

6 Claims, 6 Drawing Sheets

COMPLEX CURVED SURFACE CREATION METHOD

BACKGROUND OF THE INVENTION

1. Field of the Invention

This invention relates to a method of generating a complex curved surface and, more particularly, to a method of generating a complex curved surface by combining at least two three-dimensional curved surfaces.

2. DESCRIPTION THE RELATED ART

A curved surface of a three-dimensional metal mold or the like on a design drawing is generally expressed by a plurality of section curves, but no profile data is shown for the shape of the area lying between a certain section curve and the next adjacent section curve. In numerically controlled machining it is essential that machining be carried out so as to smoothly connect these two section curves despite the fact that the profile between them is not given. In other words, this means that machining must be performed by generating the curved surface between the two section curves from such data as that indicative of the section curves, storing on an NC tape the data concerning the generated curved surface, and carrying out machining in accordance with commands from the NC tape. To this end, there has been developed and put into practical use a method comprising generating a plurality of intermediate sections in accordance with predetermined rules from data specifying several sections and section curves of a three-dimensional curved body, finding a section curve (intermediate section curve) on the curved body based on the intermediate sections, and generating a curved surface of the three-dimensional body based on the plurality of generated intermediate section curves. (For example, see U.S. Pat. No. 4,491,906). This method is useful in generating a smooth curved surface from section data.

Depending upon machining, there are cases where it is necessary to machine a complex curved surface obtained by combining two or more three-dimensional curved surfaces, or in other words, to create a complex curved surface. However, it is not possible with the prior art to create a complex curved surface in a simple manner by combining these three-dimensional curved surfaces using the data indicative of each three-dimensional curved surface. Accordingly, the applicant has proposed in Japanese Patent Application No. 60-39445 (corresponding to PCT/JP86/00100) a novel method of creating complex curved surfaces.

This proposed method of creating complex curved surfaces includes the following steps, with reference being had to FIG. 8:

(a) inputting data in advance for specifying first and second three-dimensional curved surfaces 12a, 12b constituting a complex curved surface 11;

(b) inputting data specifying one line of intersection $CL_i$ on a predetermined plane (e.g. the X-Y plane) 10 as well as a rule for specifying a number of lines of intersection on the X-Y plane on the basis of said line of intersection;

(c) finding first and second section curves 13a, 3b obtained when the first and second three-dimensional curved surfaces 12a, 12b are cut by a section which has the i-th line of intersection $CL_i$, among the number of lines of intersection, as its line of intersection with the X-Y plane;

(d) obtaining a point of intersection $CR_i$ between the two section curves 13a, 13b; and (e) generating the complex curved surface 11 by adopting a set of the points of intersection $CR_i$ (i=1, 2, ...) corresponding to the lines of intersection $CL_i$ (i=1, 2, ...) as an intersection CRL between the first and second three-dimensional curved surfaces 12a, 12b.

The section curves 13a, 13b are obtained as sets of discrete points on the respective three-dimensional curves surfaces 12a, 12b and the section curves 13a, 13b are specified by obtaining points over the entire range of these three-dimensional curved surfaces. In other words, for the first three-dimensional curved surface 12a, the section curve 13a is specified by discretely obtaining all points from the end point A1 to the end point A2; for the second three-dimensional curved surface 12b the section curve 13b is specified by discretely obtaining all points from the end point B1 to the end point B2.

Thus, with the proposed method, the section curves 13a, 13b are obtained over the entire range (between A1 and A2 and between B1 and B2) of the respective three-dimensional curved surfaces, the point of intersection $CR_i$ is found by using the section curves obtained, and an intersection is formed by similarly obtaining a set of obtained points of intersection $CR_i$ (i=1, 2, ...).

However, the segment from $CR_i$ to end point A2 on the section curve 13a and the segment from $CR_i$ to end point B1 on the section curve 13b do not form a complex curved surface but are necessary merely for the purpose of obtaining the point of intersection $CR_i$, which can be found even if section curves are not obtained over the entire ranges mentioned above.

In other words, a problem with the proposed method is that a considerable period of time is required for processing since unnecessary segments of the section curves are obtained.

Accordingly, an object of the present invention is to provide a complex curved surface creation method in which it suffices to obtain only section curves within predetermined ranges necessary for generating a complex curved surface, thereby shortening processing time.

SUMMARY OF THE INVENTION

An object present invention is to provide a method of creating a complex curved surface by efficiently combining at least two three-dimensional curved surfaces.

The above object is attained by providing a method of creating a complex curved surface including a step of inputting data for specifying each of the three-dimensional curved surfaces, and inputting, for every three-dimensional curved surface, data specifying a reference line of intersection on a predetermined plane, a rule for specifying a number of lines of intersection on the predetermined plane on the basis of the reference line of intersection, and a range for obtaining a section curve of each of the three-dimensional curved surfaces, with each section curve being obtained when the three-dimensional curved surface is cut by a predetermined section. Also included is a step of obtaining first and second section curves in the above mentioned ranges when the first and second three-dimensional curved surfaces are cut by a section whose line of intersection with the predetermined plane is an i-th line of intersection among the number of lines of intersection, a step of obtaining a point of intersection between the two section curves, and a step of adopting a set of first and second section curve segments, having the point of intersection as a boundary, as a section curve $SC_i$ of the complex curved surface, so that the complex curved surface can be generated by sets of these section curves $SC_i$ (i=1, 2, ...).

DESCRIPTION OF THE PREFERRED EMBODIMENT

Figure 1:
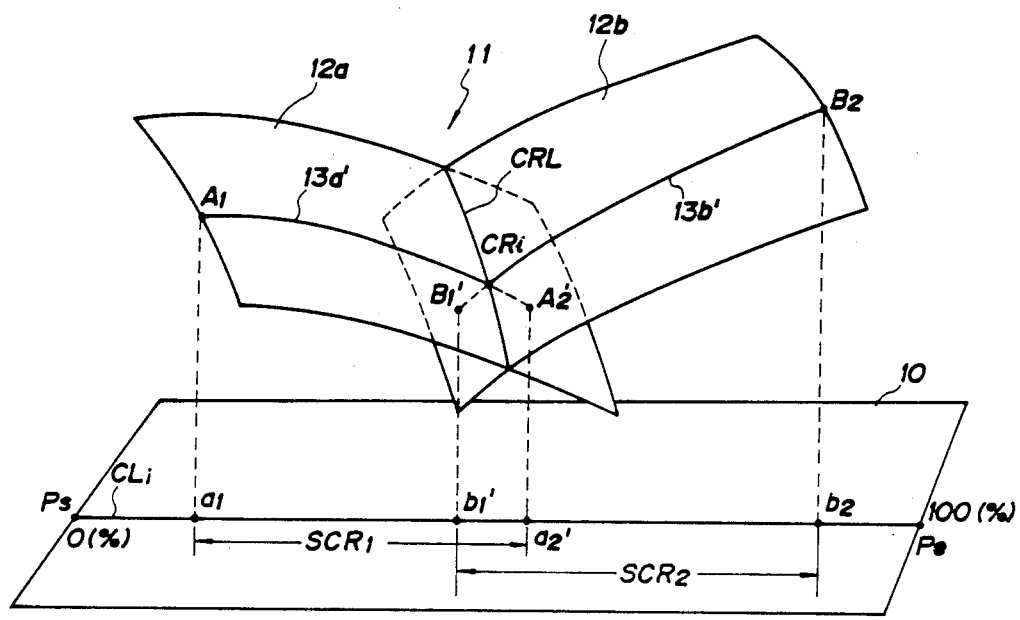
FIG. 1 is a perspective view for describing the general features of the present invention.

FIG. 1 is a view for describing the general features of the present invention.

Numeral 11 denotes a complex curved surface. Numerals 12a, 12b denote first and second curved surfaces constituting the complex curved surface. Numerals 13a', 13b', designate partial section curves obtained when the first and second curved surfaces are cut by a section 13 perpendicular to the XY plane. $CL_i$ designates a line of intersection between the XY plane and the abovementioned section, and $CR_i$ a point of intersection between the section curve 13a' and section curve 13b'. $A_1-A_2'$ is a range on the curved surface of section curve 13a', $B_1'-B_2$ is a range on the curved surface of section curve 13b', SCR1 is a range of the section curve 13a' on the line of intersection $CL_i$, and SCR2 is a range of the section curve 13b' on the line of intersection $CL_i$.

The range SCR1 is $a_1\%-a_2\%$ and the range SCR2 is $b_1-b_2\%$, where the starting point $P_s$ and end point $P_e$ of the line of intersection $CL_i$ are 0% and 100%, respectively.

The point of intersection $CR_i$ can be determined even if the section curves are not obtained over the entire ranges of the respective three-dimensional curved surfaces. Accordingly, in the present invention, the ranges SCR1, SCR2 necessary for curved surface creation are determined beforehand for every curved surface, the section curves 13a', 13b' are obtained within these ranges, the point of intersection $CR_i$ is found using both of these section curves 13a', 13b', and an intersection CRL is formed of a set of similarly obtained points of intersection $CR_i$ (i=1, 2,...)

Figure 2:
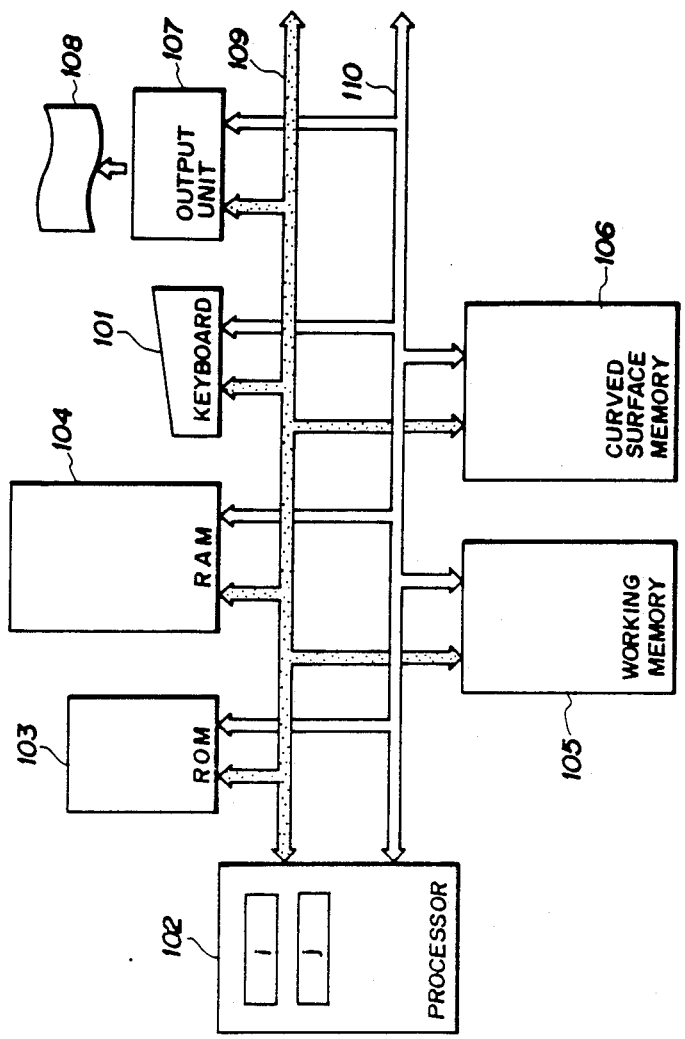
FIG. 2 is a block diagram of an apparatus for practicing the present invention.

FIG. 2 is a block diagram of an automatic programming apparatus for practicing the method of the present invention. In FIG. 2, numeral 101 denotes a keyboard for data input, 102 a processor, 103 a ROM storing a control program, 104 a RAM, and 105 a working memory. Numeral 106 designates a curved surface memory for storing curved surface data indicative of a generated complex curved surface, as well as NC program data for curved surface machining, 107 an output unit for outputting curved surface data indicative of a generated complex curved surface, or NC program data for curved surface machining, to an external storage medium 108 such as a paper tape or magnetic tape, 109 an address bus, and 110 a data bus.

Figure 3:
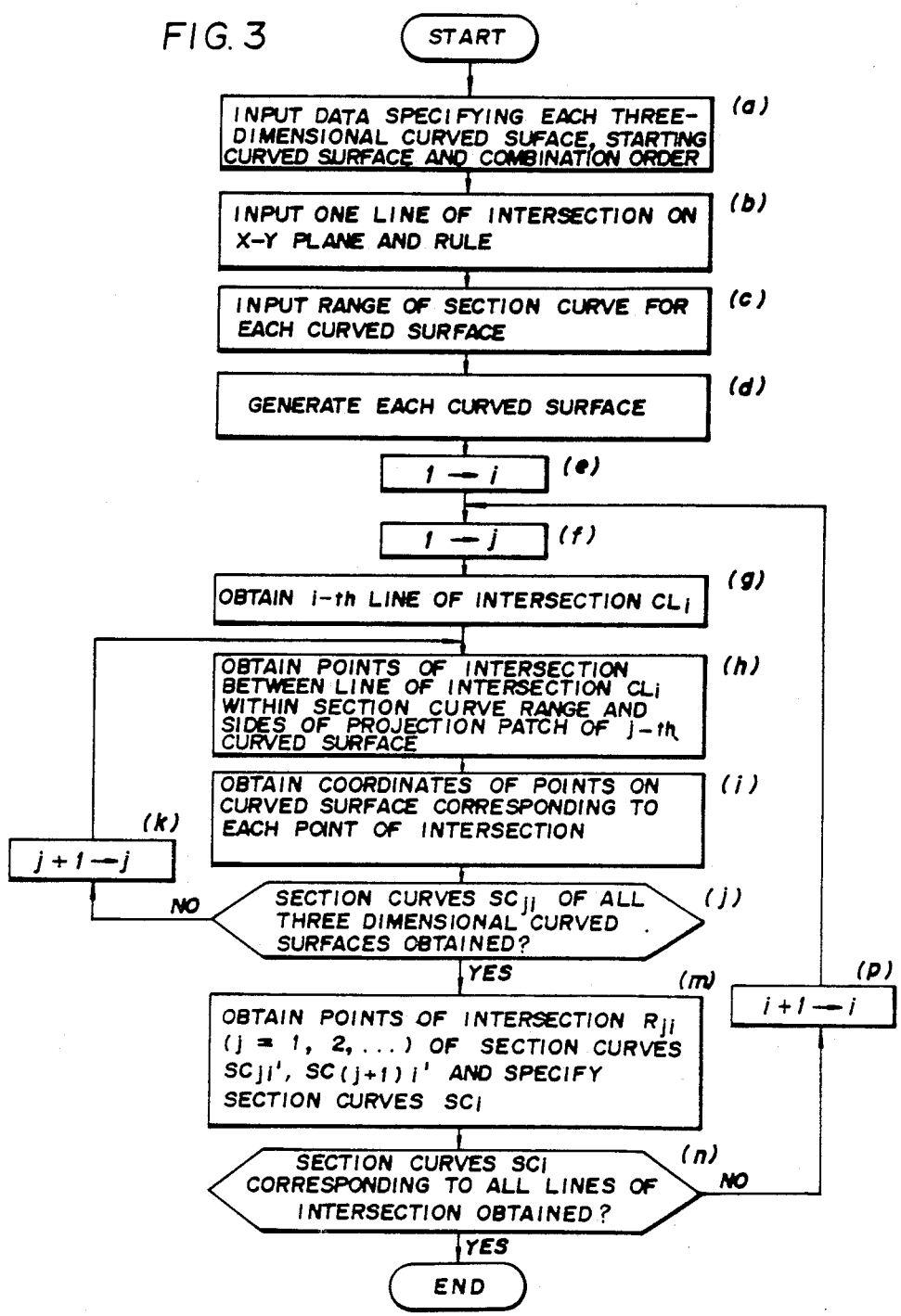
FIG. 3 is a flowchart of processing according to the present invention.
Figure 4:
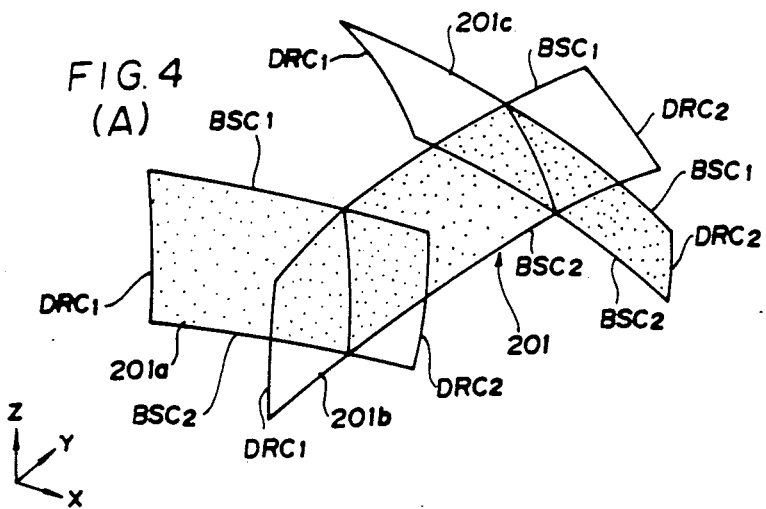
FIGS. 4(A)-4(C), 5(A)-5(C), 6, and are two-and three-dimensional views for describing complex curved surface creation processing.
Figure 4:
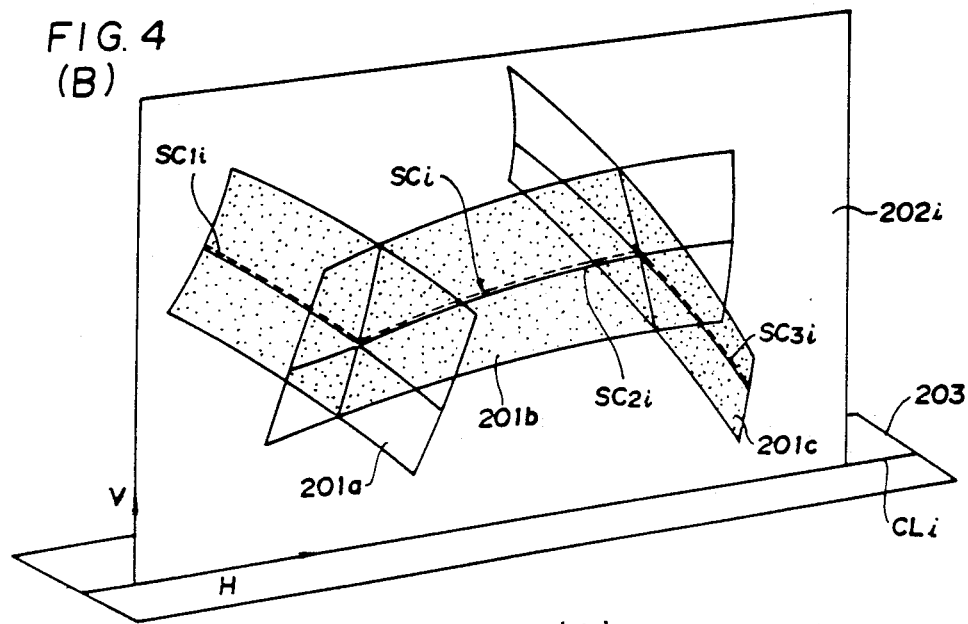
Figure 4:
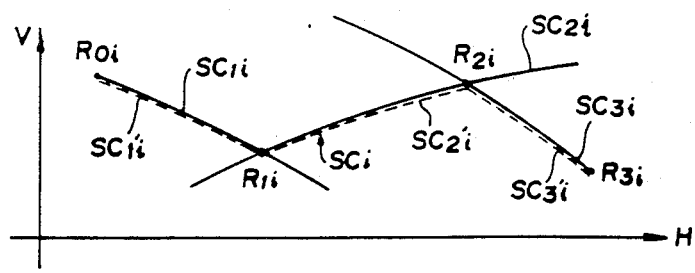

A method of creating a complex curved surface in accordance with the present invention will now be described in accordance with the flowchart of FIG. 3 block diagram of FIG. 2 and two-and Three-dimensional views of FIGS. 4(a)-7;

(a) First, data is entered from the keyboard 101 specifying a first three-dimensional curved surface 201a, a second three-dimensional curved surface 201b, a third three-dimensional curved surface 201c... constituting a complex curved surface 201 [see FIG. 4(A)]. In addition, the starting curved surface (assumed to be the first three-dimensional curved surface) is designated as well as the order in which the curved surfaces are combined (the order is assumed here to be the first curved surface, the second curved surface, the third curved surface, ..., and so on), to generate the complex curved surface. This inputted data is stored in the RAM 104 (FIG. 2). Each of the three-dimensional curved surfaces 201a-201c is specified by two operating curves DRC1, DRC2 and two base curves BSC1, BSC2, etc. Each of the three-dimensional curved surfaces is specified by entering these curve data and the like.

(b) Next, data is inputted from the keyboard 101 for specifying a number of sections perpendicular to the X-Y plane, which cuts the complex curved surface 201, and this data is stored in the RAM 104. More specifically, a single line of intersection $CL_i$ on the X-Y plane 203 is inputted, as well as a rule for specifying a number of lines of intersection in the X-Y plane on the basis of the single line of intersection.

Figure 5A:
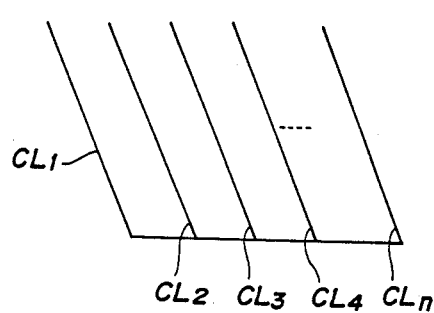

By way of example, in a case where the sections are parallel to one another and perpendicular to the X-Y plane and, moreover, the spacing between adjacent sections is constant, the line of intersection $CL_i$ (i=1, 2, 3,...) between each section and the X-Y plane is as shown in FIG. 5(A). In such case, therefore, data specifying the first line of intersection $CL_1$, as well as the distance between two adjacent lines of intersection (either the distance along the X axis or the distance along the Y axis will suffice), is inputted.

Figure 5B:
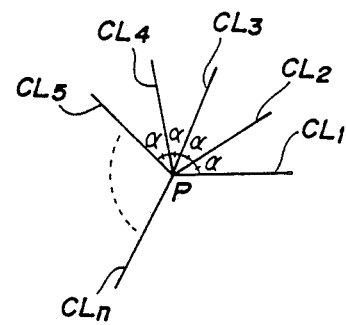

In a case where the sections intersect one another in a straight line perpendicular to the X-Y plane and, moreover, the angles between adjacent sections are constant, lines of intersection $CL_i$ (i=1, 2, 3,...) between the sections and the X-Y plane intersect successively at equal angles at a single point P, as shown in FIG. 5(B). In such case, therefore, data are inputted specifying the first line of intersection $CL_1$ and the point P, and an angle $\alpha$ defined by two mutually adjacent lines of intersection is also inputted.

Figure 5C:
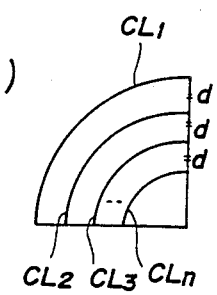

Further, in a case where the sections are mutually concentric cylinders perpendicular to the X-Y plane and, moreover, the spacing between adjacent cylinders is constant, the lines of intersection $CL_i$ (i=1, 2, 3,...) between the sections and the X-Y plane are concentric cylindrical arcs, as shown in FIG. 5(C). In such case, therefore, data is inputted specifying the first line of intersection $CL_1$, and the distance d between two mutually adjacent lines of intersection is also inputted. If the lines of intersection shown in FIG. 5(A) and the rule are inputted, the three-dimensional curved surfaces 201a-201c are cut by a predetermined section $202_i$ [see FIG. 4(B)] specified by the line of intersection and the rule. The section curves that result are $SC_{1i}, SC_{2i}, SC_{3i}$, ... and so on.

(c) When the line of intersection on the XY plane and the rule have been inputted, a range for determining a section curve is inputted for each three-dimensional curved surface. It should be noted that when the starting point and end point of the line of intersection specified in step (b) are the 0% position and 100% position, respectively, the ranges for determining the section curves are specified by designating the percentage ranges on the line of intersection.

Figure 6:
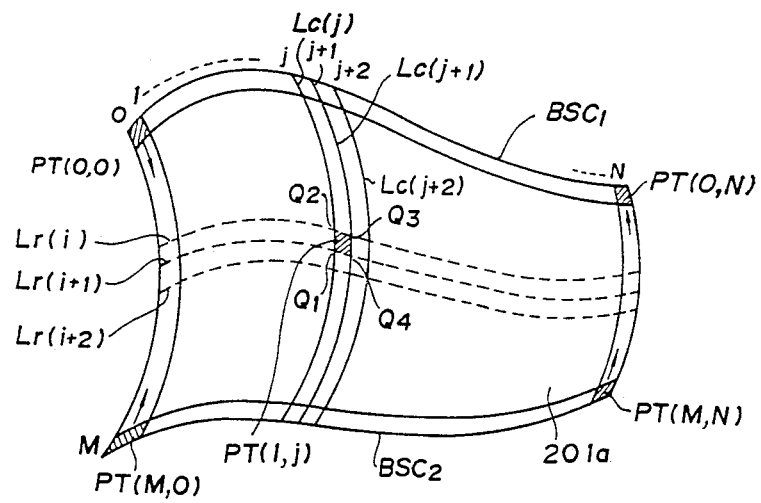

(d) When these data have been entered, the processor 102 generates each of the three-dimensional curved surfaces 201a–201c by a well-known method (for example, see U.S. Pat. 4,491,906). As shown in FIG. 6, let $L_c(j)$ express an intermediate section curve containing a j-th dividing point on the base curve BSC1 of the created three-dimensional curved surface, and let $L_r(i)$ express a curve obtained by connecting an i-th dividing point on each of the intermediate section curves $L_c(j)$ (j=1, 2, 3, . . .n). A quadrilateral bounded by curves $L_c(j)$, $L_c(j+1)$, $L_r(i)$ and $L_r(i+1)$ shall be referred to as a "patch" PT (i,j). The four vertices Q1, Q2, Q3, Q4 of the patch PT(i,j) are generated by the above-described curved surface creation processing and are stored in the curve surface memory 106.

When the processing for generating each of the curved surfaces in accordance with step (d) is completed, processing for creating a complex curved surface begins, as follows:

(e) First, the operation 1→i is performed.

(f) Next, the operation 1≦j is performed.

(g) The processor 102 then obtains a line of intersection $CL_i$ on the i-th X-Y plane by using the data indicative of the 1st line of intersection and the spacing between the lines of intersection obtained in step (b).

(h) When the i-th line of intersection $CL_i$ has been found, the processor 102 finds the coordinates of points of intersection lying within the section curve range of the j-th curved surface inputted in step (c), these being from among the points of intersection between the i-th line of intersection $CL_i$ and the sides of projection patches, which are obtained by projecting each patch PT(i,J) (FIG. 6) of the j-th three-dimensional curved surface onto the X-Y plane.

(i) When the coordinates of points of intersection within the abovementioned section curve range have been found among the points of intersection between the sides of several projection patches and the i-th line of intersection $CL_i$, the coordinates of points on the j-th three-dimensional curved surface corresponding to these points of intersection are computed. Specifically, the coordinates of the points on the j-th curved surface, which points are obtained by projecting the points of intersection onto the X-Y plane, are found.

Figure 7:
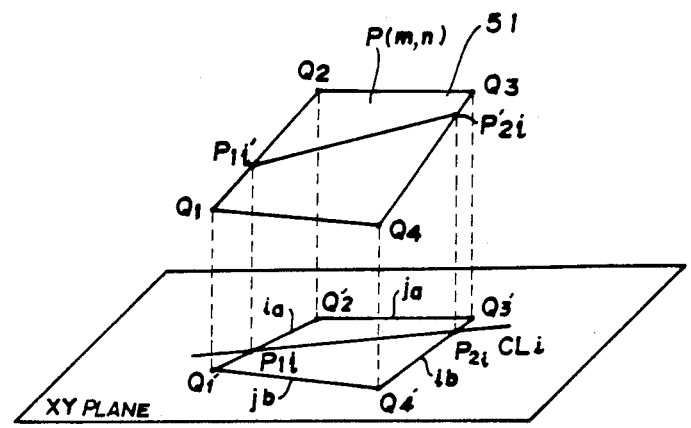
Figure 8:
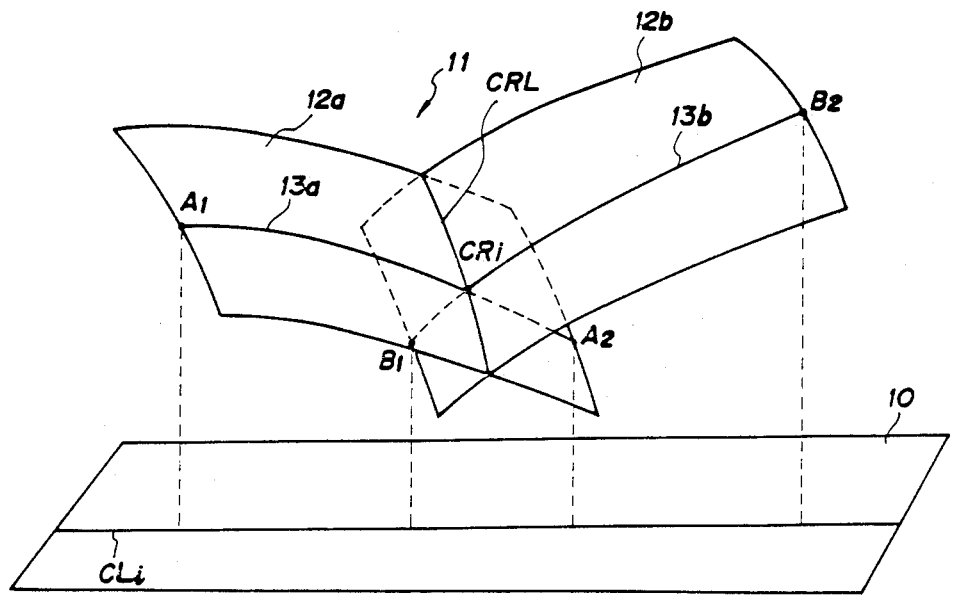
FIG. 8 is a view for describing a curved surface creation method already proposed.

FIG. 7 is a view for describing a method of computing the coordinates of the points on the curved surface. Four sides $i_a$, $i_b$, $j_a$, $j_b$ are obtained by projecting a patch P(m,n) on a three-dimensional curved surface onto the X-Y plane. Let $P1_i$, $P2_i$ represent the points of intersection between the i-th line of intersection $CL_i$ and a two of these four sides, and let $(x1_i, y1_i)$, $(x2_i, y2_i)$ represent the coordinates of these points of intersection. Further, let Q1', Q2' denote the end points of the side $i_a$ intersected by the line of intersection $CL_i$, let Q3', Q4' denote the end points of the side $i_b$ intersected by the line of intersection $CL_i$, let $Q_i$ (i=1-4) represent the points on the three-dimensional curved surface that correspond to the points $Q_i'$ (i=1-4), and let $(x_i, y_i, z_i)$ denote the coordinates of each of the points $Q_i$. Then, the Z coordinates $z1_i$, $z2_i$ of the points $P1_i'$, $P2_i'$ on the curved surface that correspond to the points of intersection $P1_i$, $P2_i$ are calculated in accordance with the following equations:

$z1_i = z1 + (z2-z1)(x1_i-x1)/(x2-x1)$
$z2_i = z3 + (z4-z3)(x2_i-x3)/(x4-x3)$

The coordinates of the points $p1_i'$, $P2_i'$ on the curved surface will be $(x1_i, y1_i, z1_i)$, $(x2_i, y2_i, z2_i)$.

The coordinates of points on the j-th three-dimensional curved surface that correspond to all of the points of intersection determined are found through the foregoing procedure and these coordinates are stored in the curved surface memory 106. This will provide a section curve $SC_{ji}$ [see FIG. 4(b)] obtained when the j-th three-dimensional curved surface is cut by a section corresponding to the i-th line of intersection CL.

(j) Next, the processor 102 checks whether the section curves for all three-dimensional curved surfaces have been obtained.

(k) If the section curves ($SC_{1i}$, $SC_{2i}$, $SC_{3i}$, . . . in FIGS. 4(C)] within the designated ranges of all three-dimensional curved surfaces have not been obtained, the operation j+1→j is performed and the processing from step (h) onward is repeated.

(m) If the section curves ($SC_{1i}$, $SC_{2i}$, $SC_{3i}$, . . . ) within the designated ranges of all three-dimensional curved surfaces have been obtained, on the other hand, the section curve $SC_i$ [see the dashed line in FIG. 4(C)] of the complex curved surface 201 is found through the following processing:

Specifically, a point of intersection between the section curve $SC_{ji}$ and a section curve $SC_{(j+1)i}$ (j=1, 2, 3 , . . . ) is calculated as illustrated in FIG. 4(C). When a point of intersection $R_{ji}$ (j=1, 2, . . .) has been found as set forth above, a section curve $SC_i$ corresponding to the i-th line of intersection $CL_i$ is specified by a section curve $SC_{1i}'$ between points of intersection $R0_i$, $R1_i$, a section curve $SC_{2i}'$ between points of intersection $R1_i$, $R2_i$, a section curve $SC_{3i}'$ between points of intersection $R2_i$, $R3_i$, . . . and so on.

(n) When the section curve $SC_i$ has been found, it is checked whether section curves corresponding to all lines of intersection $CL_i$ have been obtained.

(p) If section curves corresponding to all lines of intersection have not been obtained, the operation i+1→i is performed and processing from step (f) onward is repeated.

If section curves corresponding to all lines of intersection have been obtained, however, the processing for creating the complex curved surface ends. Thereafter, the generated curved surface data are used to create e.g. NC data for curved surface machining.

Thus, in accordance with the present invention as described above, ranges required for curved surface generation are predetermined along respective section curves, section curves are obtained within these ranges, and both section curves are used to obtain a point of intersection constituting an intersecting portion. As a result, it suffices to obtain only section curves within the specified ranges, without finding section curves over entire ranges. This makes it possible to shorten processing time.

We claim:

1. A method of creating a complex curved surface by combining at least two three-dimensional curved surfaces, said method comprising:

(a) inputting into a computing apparatus data specifying each of the three-dimensional curved surfaces, a reference line of intersection on a predetermined plane, a rule for generating lines of intersection on the predetermined plane in dependence upon the reference line, and ranges each defined for one of the three-dimensional curved surfaces to obtain a section curve for a section corresponding to one of the lines of intersection;

(b) obtaining by operation of the computing apparatus first and second section curves within the ranges when the first and second three-dimensional curved surfaces are cut by the section corresponding to an i-th line of intersection among the lines of intersection in the predetermined plane;

(c) obtaining by operation of the computing apparatus a point of intersection between the first and second section curves;

(d) adopting within the computing apparatus a set of first and second section curve segments, having the point of intersection as a common boundary, as one of a plurality of complex section curves defining the complex curved surface; and (e) machining a workpiece in dependence upon the complex section curves adopted in step (d) to produce the three-dimensional curved surfaces on the workpiece.

2. A method of creating a complex curved surface according to claim 1, wherein the ranges of the three-dimensional curved surfaces are specified by ranges on the reference line of intersection.

3. A method of creating a complex curved surface according to claim 2, wherein the ranges are input in the form of percentages on the reference line of intersection, defined by 0 percent at one end and 100 percent at the other end.

4. A method of creating a complex curved surface according to claim 1, wherein the lines of intersection are straight lines, for each line a finite length is used, and the rule generates an (i+1)th line of intersection in such a manner that spacing between the i-th line of intersection and the (i+1)th line of intersection is starting with the reference line of intersection 5. A method of creating a complex curved surface according to claim 1, wherein the lines of intersection are straight lines, for each line a finite length is used, and the rule generates an (i+1)th line of intersection in such a manner that an angle between the i-th line of intersection and the (i+1)th line of intersection at a predetermined point is constant for all the lines of intersection starting with the reference line of intersection.

6. A method of creating a complex curved surface according to claim 1, wherein the lines of intersection are concentric circular arcs and the rule generates an (i+1)th circular arc in such a manner that spacing between an i-th circular arc and the (i+1)th circular arc is constant for all the lines of intersection with the reference line of intersection serving as a first circular arc.

* * * * *

UNITED STATES PATENT AND TRADEMARK OFFICE
CERTIFICATE OF CORRECTION

PATENT NO. : 4,870,597

DATED : September 26, 1989

INVENTOR(S) : Seki et al.

It is certified that error appears in the above-identified patent and that said Letters Patent is hereby corrected as shown below:

FRONT PAGE, Col. 2, [57] ABSTRACT,
    line 2, surface, which includes a step of" should be --surface--;
    line 13, "the range" should be --the specified range--; and
    line 13, "(SCR 1," should be --(SCR1,--.

Col. 1, line 13, "DESCRIPTION THE RELATED ART" should be --DESCRIPTION OF THE RELATED ART--;
    line 65, "13a, 3b" should be --13a, 13b--.

Col. 2, line 48, after "object" insert --of--;
    line 48, before "present" insert --the--.

Col. 3, line 16, "and are" should be --and 7 are--.

Col. 4, line 3, "3" should be --3,--;
    line 4, "two-and Three-dimen-" should be -- two- and three-dimen- --
    line 5, "FIGS. 4(a)-7;" should be --FIGS. 4(A)-7.--;

Col. 5, line 27, "$1 \leq j$" should be --$1 \to j$--;
    line 57, "and a two" should be --and two--.

Col. 6, line 6, "$p_{li}$'," should be --$P_{li}$',--;
    line 19, "($SC_{li}$," should be --[$SC_{li}$,--.

Col. 8, line 11, "is starting" should be --is constant for all lines of intersection starting--;

UNITED STATES PATENT AND TRADEMARK OFFICE
CERTIFICATE OF CORRECTION

PATENT NO. : 4,870,597

DATED : September 26, 1989

INVENTOR(S) : Seki et al.

It is certified that error appears in the above-identified patent and that said Letters Patent is hereby corrected as shown below:

Col. 8, line 12, "intersection" should be --intersection.--.

Signed and Sealed this

Second Day of October, 1990

Attest:

Attesting Officer

HARRY F. MANBECK, JR.

Commissioner of Patents and Trademarks